United States Patent
Akuzawa et al.

(10) Patent No.: US 10,028,238 B2
(45) Date of Patent: Jul. 17, 2018

(54) RESONANCE TYPE POWER TRANSMISSION SYSTEM, TRANSMITTING DEVICE, AND POWER SUPPLY POSITION CONTROL SYSTEM

(71) Applicant: Mitsubishi Electric Engineering Company, Limited, Chiyoda-ku (JP)

(72) Inventors: Yoshiyuki Akuzawa, Chiyoda-ku (JP); Yuki Ito, Chiyoda-ku (JP); Hiroshi Matsumori, Chiyoda-ku (JP)

(73) Assignee: Mitsubishi Electric Engineering Company, Limited, Chiyoda-ku (JP)

(*) Notice: Subject to any disclaimer, the term of this patent is extended or adjusted under 35 U.S.C. 154(b) by 0 days.

(21) Appl. No.: 15/522,165

(22) PCT Filed: Dec. 5, 2014

(86) PCT No.: PCT/JP2014/082294
§ 371 (c)(1),
(2) Date: Apr. 26, 2017

(87) PCT Pub. No.: WO2016/088261
PCT Pub. Date: Jun. 9, 2016

(65) Prior Publication Data
US 2017/0325182 A1    Nov. 9, 2017

(51) Int. Cl.
*H04B 1/18* (2006.01)
*H04W 52/38* (2009.01)
(Continued)

(52) U.S. Cl.
CPC ............. *H04W 52/38* (2013.01); *G01S 3/48* (2013.01); *H01Q 21/24* (2013.01);
(Continued)

(58) Field of Classification Search
CPC .................................................. H04B 5/0037
(Continued)

(56) References Cited

U.S. PATENT DOCUMENTS 8,766,487 B2    7/2014 Dibben et al.
8,884,468 B2    11/2014 Lemmens et al.
(Continued)

FOREIGN PATENT DOCUMENTS

JP    2006-246633 A    9/2006
JP    2008-283791 A    11/2008
(Continued)

OTHER PUBLICATIONS

International Search Report dated Feb. 17, 2015 in PCT/JP2014/082294 filed Dec. 5, 2014.
(Continued)

*Primary Examiner* — Tu X Nguyen
(74) *Attorney, Agent, or Firm* — Oblon, McClelland, Maier & Neustadt, L.L.P.

(57) ABSTRACT

A transmitting device includes a transmission power supply to output electric power, whose frequency matches a resonance frequency of each of the transmitting antennas, based on input power, plural switches respectively provided for the transmitting antennas, the switches being switchable to connect or disconnect supply lines for supplying the electric power outputted by the transmission power supply to the transmitting antennas, a parameter detector to detect parameters regarding the transmission power supply, the parameter being changed as a receiving antenna gets close to the transmitting antennas, by using a protective function of the transmission power supply, and a switch controller to estimate the position of the receiving antenna from the result of the detection, and to perform switching control on the switches in accordance with the position of the receiving antenna.

17 Claims, 12 Drawing Sheets

(51) Int. Cl.
*G01S 3/48* (2006.01)
*H04B 7/08* (2006.01)
*H01Q 21/24* (2006.01)
*H04B 1/04* (2006.01)
*H04B 1/3805* (2015.01)

(52) U.S. Cl.
CPC ......... *H04B 1/0458* (2013.01); *H04B 1/3805* (2013.01); *H04B 7/086* (2013.01)

(58) Field of Classification Search
USPC .................................. 455/107, 121, 193.2
See application file for complete search history.

(56) References Cited

U.S. PATENT DOCUMENTS

| | | | |
|---|---|---|---|
| 8,884,469 | B2 | 11/2014 | Lemmens et al. |
| 2007/0139000 | A1 | 6/2007 | Kozuma et al. |
| 2010/0225172 | A1 | 9/2010 | Kozuma et al. |
| 2011/0285210 | A1 | 11/2011 | Lemmens et al. |
| 2011/0291491 | A1 | 12/2011 | Lemmens et al. |
| 2012/0175967 | A1 | 7/2012 | Dibben et al. |
| 2012/0274151 | A1 | 11/2012 | Kozuma et al. |
| 2013/0015705 | A1 | 1/2013 | Abe |
| 2013/0127254 | A1 | 5/2013 | Miichi et al. |
| 2013/0241288 | A1 | 9/2013 | Kozuma et al. |
| 2014/0333146 | A1 | 11/2014 | Dibben et al. |
| 2014/0354223 | A1* | 12/2014 | Lee .................. H02J 5/005 320/108 |
| 2015/0054354 | A1 | 2/2015 | Lemmens et al. |

FOREIGN PATENT DOCUMENTS

| | | |
|---|---|---|
| JP | 2011-507481 A | 3/2011 |
| JP | 2011-507482 A | 3/2011 |
| JP | 2011-211874 A | 10/2011 |
| JP | 2011-215001 A | 10/2011 |
| JP | 2011-223716 A | 11/2011 |
| JP | 2013-27245 A | 2/2013 |
| JP | 2014-50257 A | 3/2014 |
| JP | 2014-155303 A | 8/2014 |
| JP | 2014-526871 A | 10/2014 |
| WO | WO 2013/036947 A2 | 3/2013 |
| WO | WO 2014/188713 A1 | 11/2014 |

OTHER PUBLICATIONS

Office Action dated Jul. 28, 2015 in Japanese Patent Application No. 2015-515747 (with English language translation).
Office Action dated Oct. 20, 2015 in Japanese Patent Application No. 2015-515747 (with English language translation).

* cited by examiner

FIG.4
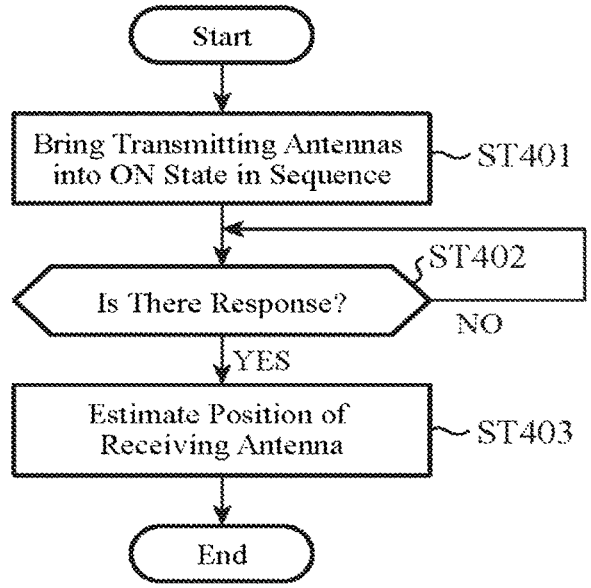
FIG.5
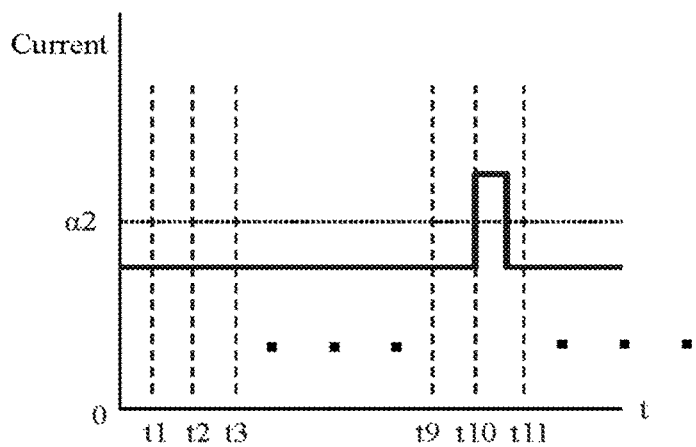
FIG.6
|  | First Position Estimating Method | Second Position Estimating Method |
|---|---|---|
| Input Detecting Unit | × | ○ |
| Power Supply Parameter Detecting Unit | × | ○ |
| Output Detecting Unit | ○ | ○ |

RESONANCE TYPE POWER TRANSMISSION SYSTEM, TRANSMITTING DEVICE, AND POWER SUPPLY POSITION CONTROL SYSTEM

TECHNICAL FIELD

The present invention relates to a resonance type power transmission system including a transmitting device having plural transmitting antennas, and a receiving device having a receiving antenna, the transmitting device, and a power supply position control system.

BACKGROUND ART

Conventionally, a system, in which when a receiving antenna gets close to plural transmitting antennas disposed, the position and posture of the receiving antenna is estimated, and power transmission is performed between a specific transmitting antenna and the receiving antenna, is known (for example, refer to patent literature 1). In a system disclosed by this patent literature 1, an existence detecting unit on a transmission side detects the voltage of each coil for power supply (transmitting antenna), and a positional posture estimating unit on the transmission side estimates the position and posture of a coil for reception (receiving antenna) on the basis of a result of the detection. Further, a table regarding the output power of an electricity-receiving device (receiving device) stored in a memory in advance. Then, a power supply control unit selects a power supply pattern, in which the output power of the electricity-receiving device is maximized, and supplies electric power, by referring to the table stored in the memory in accordance with a result of the estimation performed by the positional posture estimating unit. Thus, electric power can be supplied to the electricity-receiving device with a high degree of efficiency, regardless of the position and posture of the receiving antenna.

CITATION LIST

Patent Literature

Patent Literature 1: Japanese Unexamined Patent Application Publication No. 2013-27245

SUMMARY OF INVENTION

Technical Problem

However, in the conventional configuration, many dedicated circuits (the existence detecting unit, the positional posture estimating unit, the memory and the power supply control unit) are provided in order to estimate the position and posture of the receiving antenna and supply electric power to the electricity-receiving device. Therefore, there is a problem in that it is difficult to achieve downsizing, reduction in weight, and reduction in cost with regard to the whole system. A further problem is that the power consumption of the whole system is increased due to an increase in the power consumption of the above-mentioned dedicated circuits.

The present invention is made in order to solve the above-mentioned problems, and it is therefore an object of the present invention to provide a resonance type power transmission system, a transmitting device and a power supply position control system capable of achieving downsizing, reduction in weight, and reduction in cost with regard to the whole system and reducing the power consumption of the whole system, as compared with a system having the conventional configuration.

Solution to Problem

According to the present invention, there is provided a resonance type power transmission system including a transmitting device having plural transmitting antennas, and a receiving device having a receiving antenna, wherein the transmitting device includes: one transmission power supply to output electric power, whose frequency matches a resonance frequency of the transmitting antennas, on a basis of input power; plural switches respectively provided for the transmitting antennas, the switches being switchable in such a way as to connect or disconnect supply lines for supplying the electric power outputted by the transmission power supply to the corresponding transmitting antennas; a parameter detector comprised of a function of preventing breakage of the transmission power supply, the function being included by the transmission power supply, to detect a parameter regarding the transmission power supply, the parameter being changed as the receiving antenna gets close to the transmitting antennas; and a switch controller to estimate a position of the receiving antenna from a result of the detection performed by the parameter detector, and to perform switching control on the switches in accordance with the position of the receiving antenna.

Advantageous Effects of Invention

Because the resonance type power transmission system according to the present invention is configured as above, downsizing, reduction in weight, and reduction in cost can be achieved as the whole system, and the power consumption of the whole system can be reduced, as compared with the system having the conventional configuration.

BRIEF DESCRIPTION OF DRAWINGS

FIG. 4 is a flow chart showing a position estimating operation performed by the resonance type power transmission system according to Embodiment 1 of the present invention (when the transmitting antennas are sequentially brought into the ON state);

FIG. 5 is a diagram showing an example of a change in a signal when the receiving antenna gets close to a transmitting antenna in the position estimating operation shown in FIG. 4;

FIG. 6 is a list showing a position estimating method applicable to each parameter detected in the resonance type power transmission system according to Embodiment 1 of the present invention;

DESCRIPTION OF EMBODIMENTS

Hereafter, the preferred embodiments of the present invention will be explained in detail with reference to the drawings.
Embodiment 1

Figure 1:
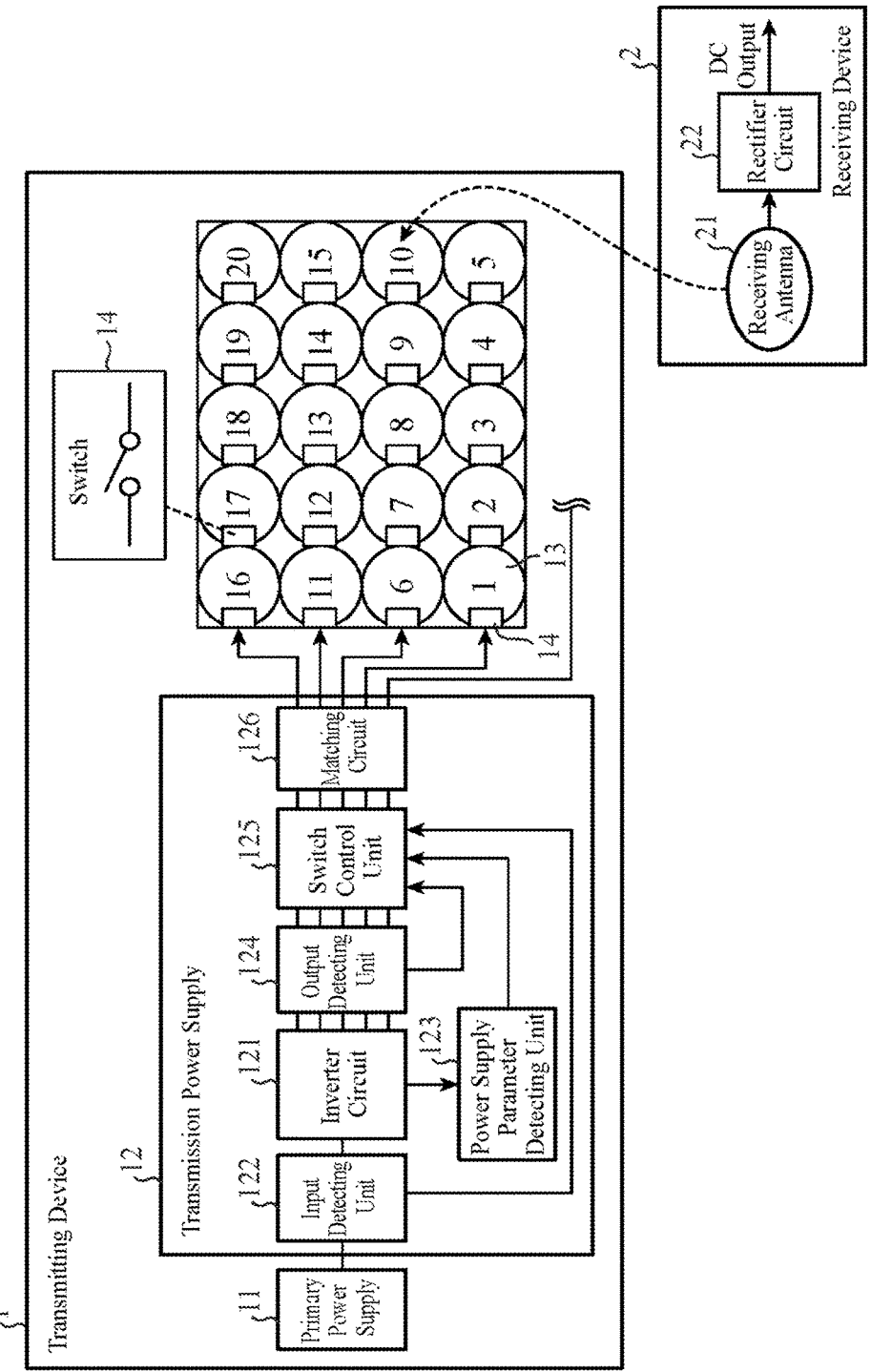
FIG. 1 is a diagram showing the configuration of a resonance type power transmission system according to Embodiment 1 of the present invention.

FIG. 1 is a diagram showing the configuration of a resonance type power transmission system according to Embodiment 1 of the present invention.

The resonance type power transmission system includes a transmitting device 1 having plural transmitting antennas 13, and a receiving device 2 having a receiving antenna 21, as shown in FIG. 1. This resonance type power transmission system has a function to make a specified transmitting antenna 13 operate by estimating the position of the receiving antenna 21 that comes close to a transmitting antenna 13 and specify its position (a function of a power supply position control system), and performs power transmission between the operated transmitting antenna 13 and the receiving antenna 21.

The transmitting device 1 has a primary power supply 11, a transmission power supply 12, the plural transmitting antennas 13, and plural switches 14, as shown in FIG. 1.

The primary power supply 11 outputs direct current power.

The transmission power supply 12 outputs electric power (high-frequency power), whose frequency matches the resonance frequency of the transmitting antennas 13 with receiving the direct current power (input power) supplied from the primary power supply 11. The details of this transmission power supply 12 will be described below. In the example of FIG. 1, the single transmission power supply 12 is provided for the plural transmitting antennas 13, and the power from the transmission power supply 12 is outputted to each of the transmitting antennas 13 in parallel.

Each of the transmitting antennas 13 resonates at the same frequency as the frequency of the high-frequency power from the transmission power supply 12. Although in the example of FIG. 1 the case in which twenty transmitting antennas 13 are disposed in an array form is shown, the number of transmitting antennas 13 installed is not limited to twenty.

The switches 14 are provided for the transmitting antennas 13, respectively, and each of the switches 14 can switch in such a way as to connect or disconnect a supply line for supplying the high-frequency power from the transmission power supply 12 to the corresponding transmitting antenna 13. When a supply line is connected by one of these switches 14, the corresponding transmitting antenna 13 is brought into an ON state and placed in a transmission mode. In contrast, when a supply line is disconnected by one of the switches 14, the corresponding transmitting antenna 13 is brought into an OFF state and is placed in a non-transmission mode. Therefore, because the resonance frequency of each of the transmitting antennas 13 greatly differs between the ON state and the OFF state, the other transmitting antennas 13 in the surroundings of each transmitting antenna are not affected. As the switches 14, for example, relays, photo couplers, transistors, or the like can be used.

Further, the transmission power supply 12 includes an inverter circuit 121, an input detecting unit 122, a power supply parameter detecting unit 123, an output detecting unit 124, a switch control 125, and a matching circuit 126, as shown in FIG. 1.

The inverter circuit 121 converts the direct current power from the primary power supply 11 into alternating current power to be outputted to each of the transmitting antennas 13.

The input detecting unit 122 detects a parameter regarding the direct current power inputted from the primary power supply 11 to the transmission power supply 12. At this time, the input detecting unit 122 detects at least one of the input current and the input voltage of the transmission power supply 12.

The power supply parameter detecting unit 123 detects parameters regarding the inverter circuit 121 within the transmission power supply 12. At this time, the power supply parameter detecting unit 123 detects, for example, at least one of the resonance voltage, the resonance current and the phases of these resonance voltage and current of the inverter circuit 121, the voltage Vds or the current Ids between the drain and the source of a switching element within the inverter circuit 121, the generation of heat of elements (an FET (Field Effect Transistor), a capacitor, an inductor, etc.) within the inverter circuit 121, and the like.

The output detecting unit 124 detects parameters regarding the electric power outputted from the transmission power supply 12 (the alternating current power after being converted by the inverter circuit 121). At this time, the output detecting unit 124 detects at least one of, for example, the output voltage or the output current from the inverter circuit 121 (phase, amplitude, effective value, or frequency), transmitted power, reflected power, and the like.

The input detecting unit 122, the power supply parameter detecting unit 123, and the output detecting unit 124 construct "a parameter detecting unit disposed in the transmission power supply, for detecting parameters regarding the transmission power supply, the parameters being changed as the receiving antenna comes close to the transmitting antennas" according to the present invention. The function of this parameter detecting unit can be implemented by using a protective function which the transmission power supply 12 usually has (a function of preventing breakage of the power supply 12), and a dedicated circuit is not needed. Further, although the case in which the transmitting device includes, as the parameter detecting unit, all of the following detecting units: the input detecting unit 122, the power supply parameter detecting unit 123, and the output detecting unit 124 is shown in FIG. 1, the transmitting device has only to include at least one of these detecting units 122 to 124. By detecting plural parameters, the accuracy of position estimation can be improved.

The switch control unit 125 has a function (position estimating function) of estimating the position of the receiving antenna 21 from a detection result acquired by the parameter detecting unit (the input detecting unit 122, the power supply parameter detecting unit 123, and the output detecting unit 124), and a function (switching control function) of performing switching control of the switches 14 in accordance with the position of the receiving antenna 21. This switch control unit 125 is implemented by program processing on the basis of software with a CPU.

The matching circuit 126 matches the impedance of the transmission power supply 12 to that of each of the transmitting antennas 13.

On the other hand, the receiving device 2 includes the receiving antenna 21 and a rectifier circuit 22, as shown in FIG. 1.

The receiving antenna 21 resonates at the same frequency as the resonance frequency of each of the transmitting antennas 13. As a result, the receiving antenna receives the high-frequency power from one of the transmitting antennas 13.

The rectifier circuit 22 converts the high-frequency power (alternating current power) received by the receiving antenna 21 into direct current power.

Next, the operation of estimating the position of the receiving antenna 21, which performed by the resonance type power transmission system configured as above, will be explained.

For the position estimating operation performed by the resonance type power train system, a method of estimating the position of the receiving antenna 21 while simultaneously bringing all the transmitting antennas 13 into the ON state (first position estimating method) and a method of estimating the position of the receiving antenna 21 while bringing the transmitting antennas 13 into the ON state in sequence (second position estimating method) are provided.

First, the method of estimating the position of the receiving antenna 21 while simultaneously bringing all the transmitting antennas 13 into the ON state will be explained with reference to FIGS. 2 and 3.

Figure 2:
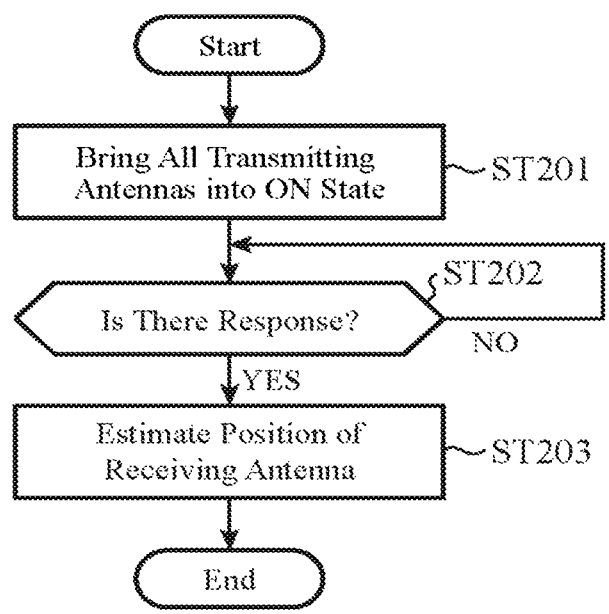
FIG. 2 is a flow chart showing a position estimating operation performed by the resonance type power transmission system according to Embodiment 1 of the present invention (when all transmitting antennas are simultaneously brought into an ON state)

In this case, first, the switch control unit 125 of the transmitting device 1 switches the switches 14 in such way as to simultaneously bring all the transmitting antennas 13 into the ON state (step ST201), as shown in FIG. 2. At this time, all the transmitting antennas 13 can be placed constantly in the ON state, or can be placed instantaneously in the ON state at arbitrary intervals.

Figure 3A:
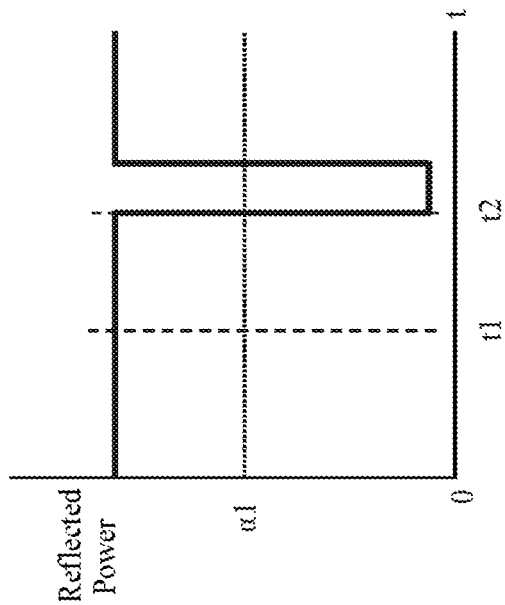
FIG. 3 is a diagram showing an example of a change in a signal when a receiving antenna gets close to transmitting antenna in the position estimating operation shown in FIG. 2.
Figure 3B:
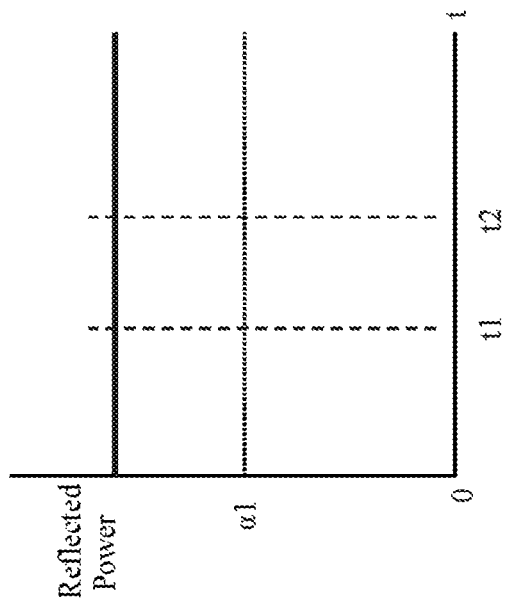

Then, the parameter detecting units (the input detecting unit 122, the power supply parameter detecting unit 123 and the output detecting unit 124) detect parameters regarding the transmission power supply 12, and the switch control unit 125 determines whether or not there is a change in the parameter (whether or not there is a response) (step ST202). FIG. 3A shows a case in which the output detecting unit 124 detects reflected power from a first transmitting antenna 13 shown in FIG. 1, and FIG. 3B shows a case in which the output detecting unit 124 detects reflected power from a tenth transmitting antenna 13 shown in FIG. 1. As shown in these FIGS. 3A and 3B, because at a time t1, no change occurs in the reflected power and the reflected power is larger than a detection threshold $\alpha 1$, it can be determined that the receiving antenna 21 has not got close to the first and tenth transmitting antennas 13. When it is determined, in this step ST202, that there is no change in the parameter regarding the transmission power supply 12, the sequence returns to step ST202 again and the resonance type power transmission system enters a standby state.

In contrast, when, in step ST202, determining that there is a change in the parameter, the switch control unit 125 estimates the position of the receiving antenna 21 (step ST203). More specifically, in the case of FIG. 3B, because the reflected power is equal to or less than the detection threshold $\alpha 1$ at a time t2, the switch control unit 125 can determine that the receiving antenna 21 has got close to the tenth transmitting antenna 13.

After that, the switch control unit 125 performs a control operation of switching the switches 14 in accordance with the detected position of the receiving antenna 21. In the example of FIG. 3, the switch control unit 125 switches the switches 14 in such a way as to bring only the tenth transmitting antenna 13 into the ON state. After that, when the receiving antenna 21 goes away from the transmitting antenna 13, the resonance type power transmission system returns to the initial state.

Next, the method of estimating the position of the receiving antenna 21 while bringing the transmitting antennas 13 into the ON state in sequence will be explained with reference to FIGS. 4 and 5.

In this case, first, the switch control unit 125 of the transmitting device 1 switches the switches 14 in such a way as to bring the transmitting antennas 13 into the ON state in sequence on by one (step ST401), as shown in FIG. 4. In this case, the switching order according to which the switches 14 are sequentially switched can be appropriately set.

Then, the parameter detecting unit (the input detecting unit 122, the power supply parameter detecting unit 123, and the output detecting unit 124) detects parameters regarding the transmission power supply 12, and the switch control unit 125 determines whether or not there is a change in the parameter (whether or not there is a response) (step ST402). FIG. 5 is a diagram showing a case in which the input detecting unit 122 detects the input current. FIG. 5 shows a case in which the first transmitting antenna 13 shown in FIG. 1 is brought into the ON state at a time t1, a second transmitting antenna 15 is brought into the ON state at a time t2, and, after that, the remaining transmitting antennas 13 are sequentially brought into the ON state in the order of numerals shown in FIG. 1. As shown in FIG. 5, because at the times t1 to t9, no change occurs in the input current and the input current is lower than a detection threshold $\alpha 2$, it can be determined that the receiving antenna 21 has not got close to the first to ninth transmitting antennas 13. When it is determined, in this step ST402, that there is no change in the parameters regarding the transmission power supply 12, the sequence returns to step ST402 again and the resonance type power transmission system enters the standby state.

In contrast, when, in step ST402, determining that there is a change in the parameter, the switch control unit 125 estimates the position of the receiving antenna 21 (step ST403). More specifically, in the case of FIG. 5, because the input current is equal to or greater than the detection threshold $\alpha 2$ at a time t10, the switch control unit 125 can determine that the receiving antenna 21 has got close to the tenth transmitting antenna 13. It is decided from the circuit configuration whether the current value changes either in an increasing direction or in a decreasing one. After that, the switch control unit 125 performs a control operation of switching the switches 14 in accordance with the detected position of the receiving antenna 21. In the example of FIG. 5, the switch control unit 125 switches the switches 14 in such a way as to bring only the tenth transmitting antenna 13 into the ON state. After that, when the receiving antenna 21 goes away from the transmitting antenna 13, the resonance type power transmission system returns to the initial state.

FIG. 6 is a list showing the position estimating methods applicable to each parameter to be detected.

As shown in FIG. 6, when the parameter detected by the input detecting unit 122 is used and when the parameter detected by the power supply parameter detecting unit 123 is used, only the second position estimating method can be applied. As for the parameter detected by the output detecting unit 124, both of the first and second position estimating methods can be applied.

As mentioned above, the resonance type power transmission system according to this Embodiment 1 is configured so as to detect parameters regarding the transmission power supply 12, the parameter being changed as the receiving antenna 21 gets close to a transmitting antenna 13, by means of the parameter detecting unit (the input detecting unit 122, the power supply parameter detecting unit 123, and the output detecting unit 124) using the protective function of the transmission power supply 12, estimate the position of the receiving antenna 21 from a detection result acquired by the parameter detecting unit, and perform switching control on the switches 14 in accordance with the position of the receiving antenna 21, by means of the switch control unit 125, so that the resonance type power transmission system can estimate the position of the receiving antenna 21 by using the function which the transmitting device 1 usually has, which achieves downsizing, reduction in weight, and reduction in cost with regard to the whole system, as compared with the system having the conventional configuration. Further, the power consumption of the whole system can be reduced.

The case in which one receiving device 2 gets close to the transmitting device 1 is explained above as an example. However, when plural receiving devices 2 get close to the transmitting device 1, power transmission can be carried out by similarly bringing the transmitting antenna 13, to which the receiving antenna 21 of each of the receiving devices has got close, into the ON state.

Figure 7:
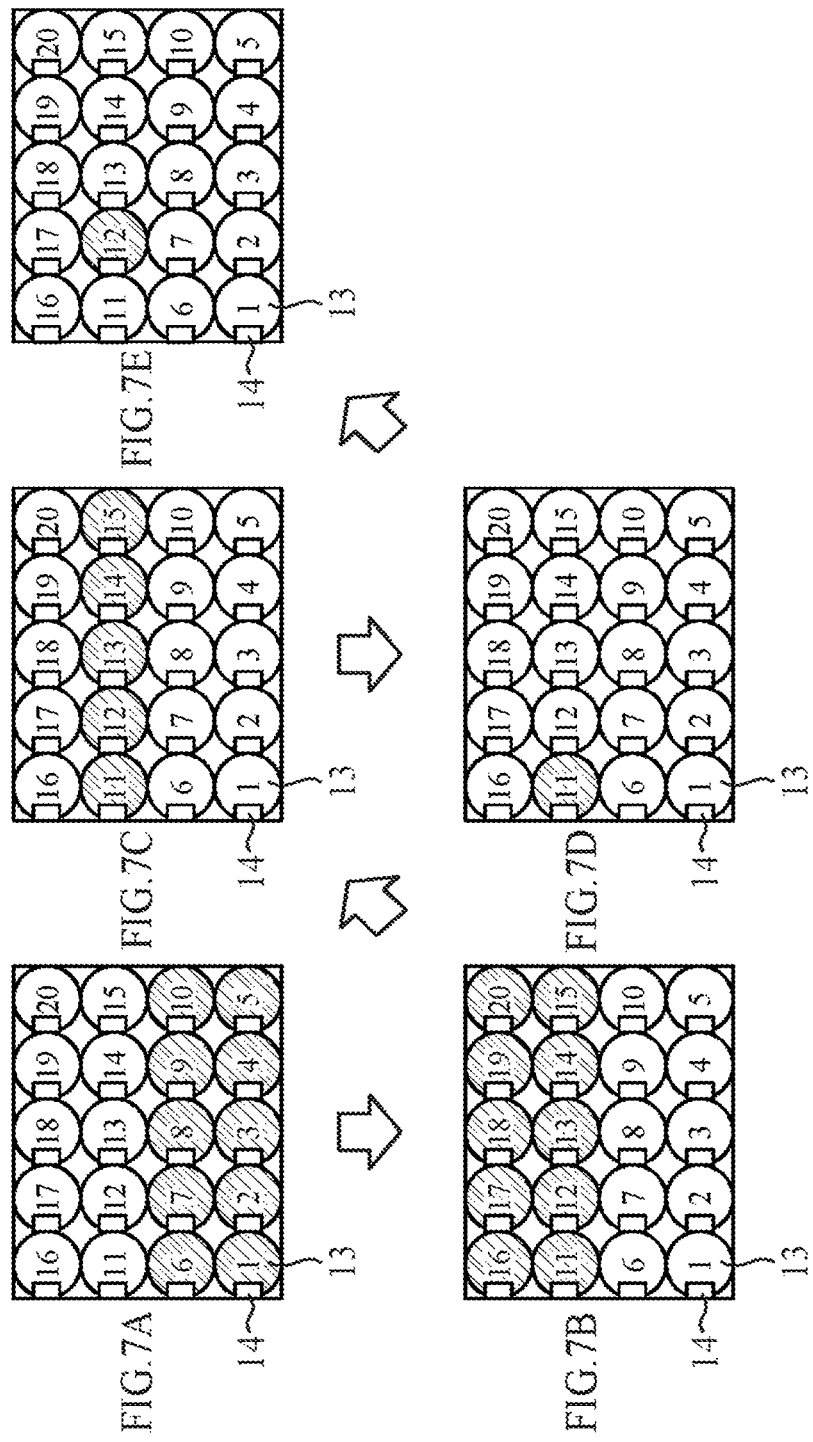
FIG. 7 is a flow chart showing a position estimating operation performed by the resonance type power transmission system according to Embodiment 1 of the present invention (when the transmitting antennas are sequentially brought into the ON state in units of blocks)

In FIGS. 4 and 5, the case of switching the transmitting antennas 13 to the ON state in sequence one by one is shown as the second position estimating method. In contrast with this, the estimation of the position of the receiving antenna 21 can be carried out while the transmitting antennas 13 are sequentially switched to the ON state in units of blocks. Hereafter, an operation will be explained with reference to an example shown in FIG. 7. In the example shown in FIG. 7, a case in which the receiving antenna 21 gets close to a twelfth transmitting antenna 13 is assumed. Further, in the example shown in FIG. 7, each transmitting antenna 13 colored in gray is in the ON state.

In this case, first, the switch control unit 125 switches the switches 14 in such a way as to simultaneously bring the first to tenth transmitting antennas 13 disposed in a lower half block into the ON state, as shown in FIG. 7A. In this case, because the receiving antenna 21 has not got close to the first to tenth transmitting antennas 13, there is no change in the parameter regarding the transmission power supply 12.

Next, the switch control unit 125 switches the switches 14 in such a way as to simultaneously bring eleventh to twentieth transmitting antennas 13 disposed in an upper half block into the ON state, as shown in FIG. 7B. In this case, because there is a change in the parameter regarding the transmission power supply 12, it can be determined that the receiving antenna 21 has got close to some one of these eleventh to twentieth transmitting antennas 13.

Then, the switch control unit 125 switches the switches 14 in such a way as to simultaneously bring the eleventh to fifteenth transmitting antennas 13 included in the upper half block into the ON state, as shown in FIG. 7C. In this case, because there is a change in the parameter regarding the transmission power supply 12, it can be determined that the receiving antenna 21 has got close to some one of these eleventh to fifteenth transmitting antennas 13.

Then, as shown in FIG. 7D, the switch control unit 125 switches the switches 14 in such a way as to bring the eleventh to fifteenth transmitting antennas 13 into the ON state in sequence, starting with the eleventh transmitting antenna 13. In this case, as shown in FIG. 7E, when the twelfth transmitting antenna 13 is brought into the ON state, the parameter regarding the transmission power supply 12 changes. Therefore, it can be determined that the receiving antenna 21 has got close to the twelfth transmitting antenna 13.

Thus, by bringing the transmitting antennas 13 into the ON state in sequence in units of blocks, the number of times in carrying out processing until the position of the receiving antenna can be estimated, and the processing time can be reduced, as compared with the case in which the transmitting antennas 13 are brought into the ON state in sequence one by one.

Embodiment 2

Figure 8:
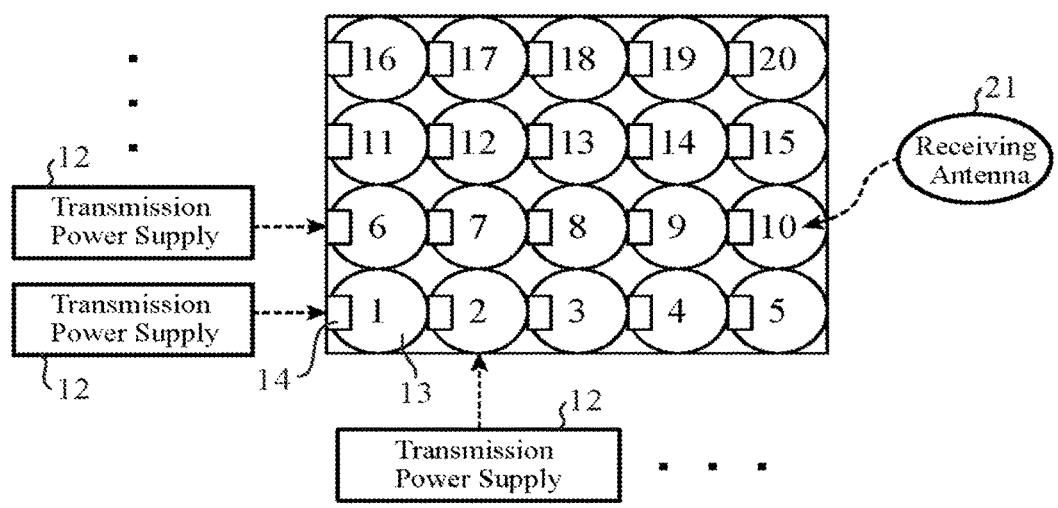
FIG. 8 is a diagram showing the configuration of a resonance type power transmission system according to Embodiment 2 of the present invention.

The example in which the single transmission power supply 12 is provided for the plural transmitting antennas 13 is shown in Embodiment 1. In contrast with this, a transmission power supply 12 can be provided for each of the transmitting antennas 13, as shown in FIG. 8. In FIG. 8, the primary power supply 11 of the transmitting device 1 and the rectifier circuit 22 of the receiving device 2 are not illustrated. With the configuration shown in FIG. 8, the transmission power of the whole system can be increased.

Further, by providing a transmission power supply 12 for each of the transmitting antennas 13, each transmission power supply 12 can be downsized, the transmission power supply 12 can be incorporated into each of the transmitting antennas 13, so that these components can be configured integrally.

Embodiment 3

Figure 9:
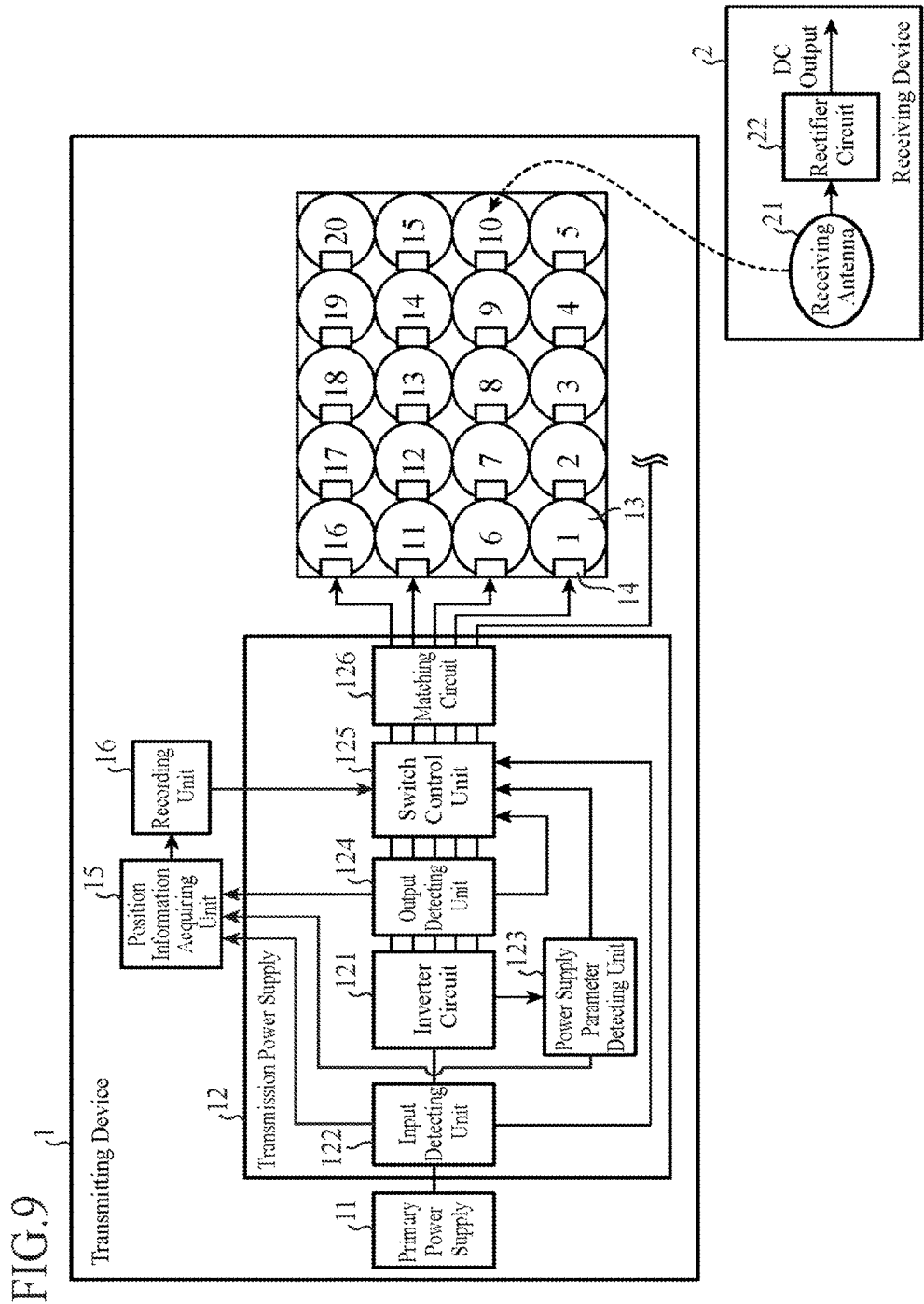
FIG. 9 is a diagram showing the configuration of a resonance type power transmission system according to Embodiment 3 of the present invention.

FIG. 9 is a diagram showing the configuration of a resonance type power transmission system according to Embodiment 3 of the present invention. The resonance type power transmission system according to the Embodiment 3 shown in FIG. 9 includes a position information acquiring unit 15 and a recording unit 16 in addition to the components of the resonance type power transmission system according to Embodiment 1 shown in FIG. 1. The other components are the same as those according to Embodiment 1, and the explanation below will be made for only a difference while the other components are designated by the same reference numerals.

The position information acquiring unit 15 acquires pieces of information each showing a position at which a receiving antenna 21 is placed, in a learning operation.

The recording unit 16 is a memory that records the results of detections performed by a parameter detecting unit, and the pieces of information acquired by the position information acquiring unit 15 and each showing the position of the receiving antenna 21 while associating the detection results with the pieces of information, in the learning operation.

When estimating the position of the receiving antenna 21, the switch control unit 125 uses the pieces of information recorded in the recording unit 16.

Next, a position estimating operation performed by the resonance type power transmission system according to Embodiment 3 will be explained.

The resonance type power transmission system according to Embodiment 3 performs the learning operation of recording, in advance, parameters detected by the parameter detecting unit for each position at which the receiving antenna 21 is placed, and the position estimating operation in which the pieces of information recorded in the recording unit 16 are used.

First, the learning operation performed by the resonance type power transmission system will be explained with reference to FIG. 10.

Figure 10:
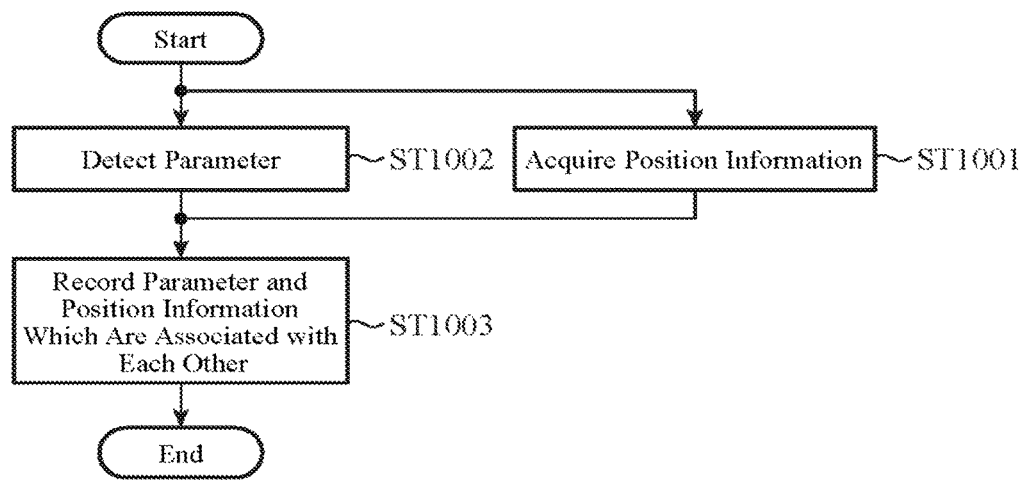
FIG. 10 is a flow chart showing a learning operation performed by the resonance type power transmission system according to Embodiment 3 of the present invention.

In the learning operation performed by the resonance type power transmission system, first, an operator places the receiving antenna 21 in such a way that the receiving antenna 21 sequentially comes close to each of transmitting antennas 13, as in FIG. 10. The position information acquiring unit 15 then acquires information showing the positions of the receiving antenna 21 at this time (step ST1001). At this time, the position information acquiring unit 15 can acquire the information showing the positions of the receiving antenna 21 which is inputted by the operator by using an input device (not shown), or can acquire the position information by using another method.

On the other hand, the parameter detecting unit (an input detecting unit 122, a power supply parameter detecting unit 123 and an output detecting unit 124) detects parameters regarding a transmission power supply 12 (step ST1002). At this time, all the transmitting antennas 13 may be simultaneously brought into an ON state by the switch control unit 125, or only an arbitrary number transmitting antennas 13 may be simultaneously brought into the ON state by the switch control unit 125.

The recording unit 16 then records a result of the detection performed by the parameter detecting unit, and the information acquired by the position information acquiring unit 15 and showing the position of the receiving antenna 21 while associating the detection result with the information (step ST1003). As a result, a database is acquired.

Next, the position estimating operation performed by the resonance type power transmission system will be explained with reference to FIG. 11.

Figure 11:
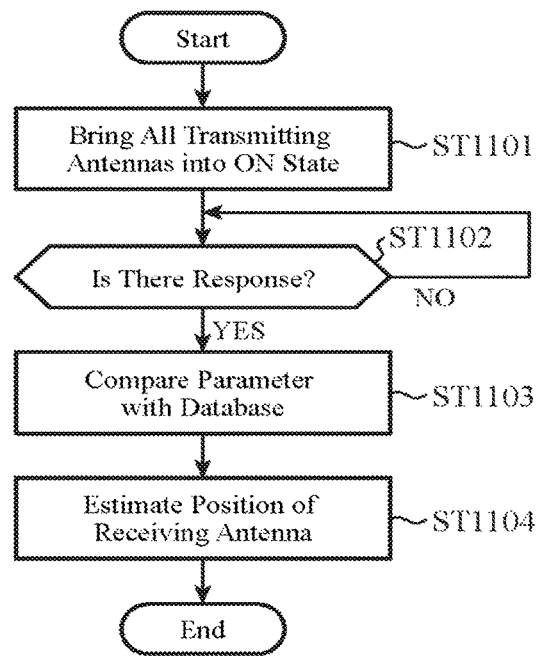
FIG. 11 is a flow chart showing a position estimating operation performed by the resonance type power transmission system according to Embodiment 3 of the present invention.

In this case, first, the switch control unit 125 performs switching control on switches 14 in such a way as to simultaneously bring all the transmitting antennas 13 into the ON state, as shown in FIG. 11. The parameter detecting unit (the input detecting unit 122, the power supply parameter detecting unit 123 and the output detecting unit 124) detects parameters regarding the transmission power supply 12, and the switch control unit 125 determines whether or not there is a change in the parameter (steps ST1101 and ST1102). When, in this step ST1102, there is no change in the parameter regarding the transmission power supply 12, the sequence returns to step ST1102 again and the resonance type power transmission system enters a standby state. Further, in the switching control on the switches 14, all the transmitting antennas 13 can be simultaneously brought into the ON state or only an arbitrary number of transmitting antennas 13 can be simultaneously brought into the ON state.

In contrast, when, in step ST1102, determining that there is a change in the parameters regarding the transmission power ply 12, the switch control unit 125 compares the value of the parameter with the information in the database recorded in the recording unit 16 (step ST1103). More specifically, the switch control unit 125 determines whether the information indicating the value change of the parameter exists in the database, and when the information indicating the value change of the parameter exists in the database, the switch control unit 125 extracts the position of the receiving antenna 21, which is associated with the value of the parameter.

The switch control unit 125 estimates the position of the receiving antenna 21 by using this comparison result (step ST1104). As a result, the processing time required for the position estimation can be reduced.

As mentioned above, the system according to this Embodiment 3 is configured so as to, in the learning operation, acquire pieces of information, each of which shows a position at which the receiving antenna 21 is placed, record the pieces of information and the parameters detected at that time while associating the pieces of information with the value of parameters, and use the pieces of information when detecting the position of the receiving antenna 21, so that the processing time required for the position estimation can be reduced in addition to the advantages provided by Embodiment 1.

The case in which the function according to Embodiment 3 is provided for the configuration according to Embodiment 1 (configuration in which a single transmission power supply 12 is provided for the plural transmitting antennas 13) is shown above. In contrast with this, the function according to Embodiment 3 can be provided for the configuration according to Embodiment 2 (configuration in which the transmission power supply 12 is provided for each of the plural transmitting antennas 13). Accordingly, the accuracy of estimation of the position of the receiving antenna 21 is improved.

Embodiment 4

The explanation is made in Embodiment 1 on the assumption that the receiving antenna 21 gets close to one of the transmitting antennas 13, and that the position of the receiving antenna is detected. However, there are cases in which a receiving antenna 21 gets close to plural transmitting antennas 13, that the position of the receiving antenna 21 extends over the positions of the plural transmitting antennas 13. Therefore, in Embodiment 4, an example in consideration of the aforementioned case will be described below. A resonance type power transmission system according to Embodiment 4 has the same configuration as that shown in FIG. 1, and only a different portion will be explained hereafter referring the configuration shown in FIG. 1.

When the estimated position of the receiving antenna 21 extends over the positions of plural transmitting antennas 13, the switch control unit 125 switches the switches 14 in such a way as to connect the supply line of the transmitting antenna 13 in which an amount of change in the parameter detected by the parameter detecting unit is great.

Figure 12:
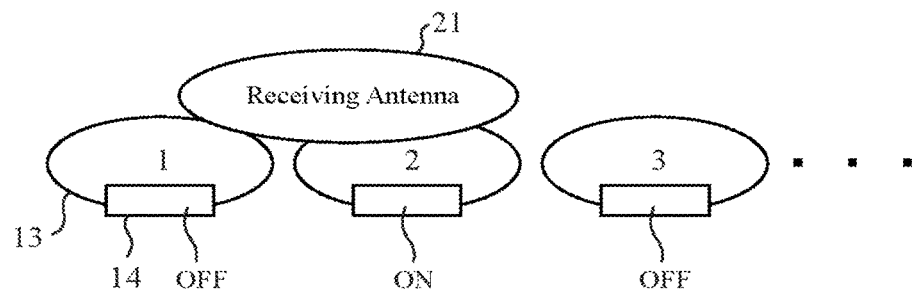
FIG. 12 is a diagram showing the operation of a resonance type power transmission system according to Embodiment 4 of the present invention.

For example, it is assumed, as shown in FIG. 12, that the position of the receiving antenna 21 extends over the positions of first and second transmitting antennas 13, and the second transmitting antenna 13 has a wider area facing the receiving antenna 21 than that of the first transmitting antenna 13. In this case, the second transmitting antenna 13 has the largest change in the parameter detected by the parameter detecting unit. Therefore, the switch control unit 125 switches the switches 14 in such a way as to bring only this second transmitting antenna 13 into an ON state. As a result, the transmitting antenna 13 having the higher efficiency in supplying power to the receiving antenna 2 can be placed in the ON state.

The case in which the function according to Embodiment 4 is provided for the configuration according to Embodiment 1 (configuration in which the single transmission power supply 12 is provided for the plural transmitting antennas 13) is shown above. In contrast with this, the function according to Embodiment 4 can be provided for the configuration according to Embodiment 2 (configuration in which a transmission power supply 12 is provided for each of the plural transmitting antennas 13). Accordingly, the same advantage can be provided.

Embodiment 5

Embodiment 4 shows the case in which when the position of the receiving antenna 21 extends over the positions of two or more transmitting antennas 13, only the transmitting antenna 13 in which the change detected by the parameter detecting unit is great is brought into the ON state In contrast with this, Embodiment 5 shows a configuration in which two or more transmitting antennas 13, over which the position of the receiving antenna 21 extends, are brought into an ON state, and a phase difference is controlled by the matching circuit 126 so as to improve the efficiency of power supply. A resonance type power transmission system according to Embodiment 4 has the same configuration as that shown in FIG. 1, and only a different portion will be explained hereafter referring the configuration shown in FIG. 1.

When the estimated position of the receiving antenna 21 extends over the positions of two or more transmitting antennas 13, the switch control unit 125 switches the switches 14 in such a way as to connect the supply lines to the two or more transmitting antennas 13 and causes the matching circuit 126 to control the phase difference of the electric power supplied to the transmitting antennas 13.

Figure 13A:
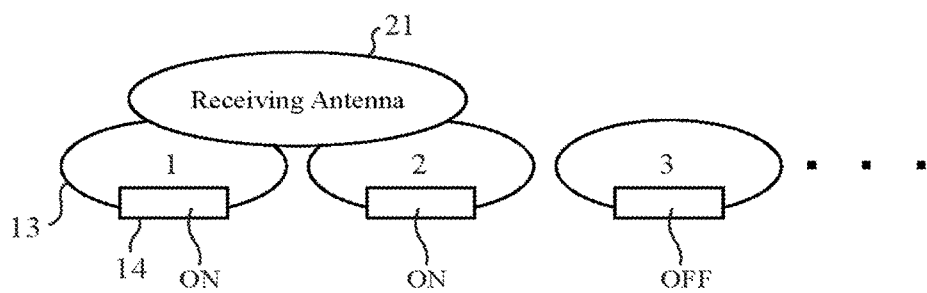
FIG. 13 is diagram showing the operation of resonance type power transmission system according to Embodiment 5 of the present invention.
Figure 13B:
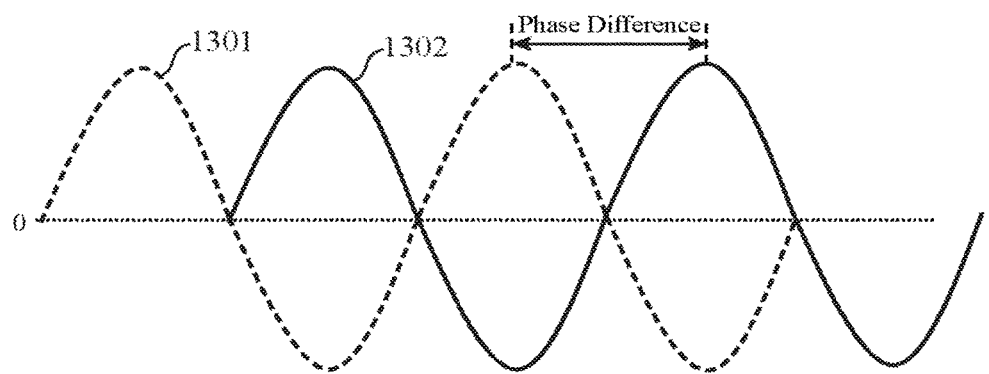

For example, it is assumed, as shown in FIG. 13A, that the position of the receiving antenna 21 extends over the positions of first and second transmitting antennas 13. In this case, the switch control unit 125 switches the switches 14 in such a way as to bring the first and second transmitting antennas 13 into the ON state. Further controls the phase of the electric power supplied to each of the transmitting antennas 13 is controlled in such a way that the efficiency of power supply between these transmitting antennas 13 and the receiving antenna 21 is enhanced, as shown in FIG. 13B. At this time, the matching circuit 126 changes the phase of the electric power supplied to each of the transmitting antennas 13 by changing a constant used to control the impedance of the transmitting antenna 13, the impedance matching that of the transmission power supply 12. In FIG. 13B, a reference numeral 1301 denotes the phase of the electric power supplied to the first transmitting antenna 13, and a reference numeral 1302 denotes the phase of the electric power supplied to the second transmitting antenna.

The case in which the function according to Embodiment 5 is provided for the configuration according to Embodiment 1 (configuration in which the single transmission power supply 12 is provided for the plural transmitting antennas 13) is shown above. In contrast with this, the function according to Embodiment 5 can be provided for the configuration according to Embodiment 2 (configuration in which the transmission power supply 12 is provided for each of the plural transmitting antennas 13). Accordingly, the same advantage can be provided.

Embodiment 6

Figure 14:
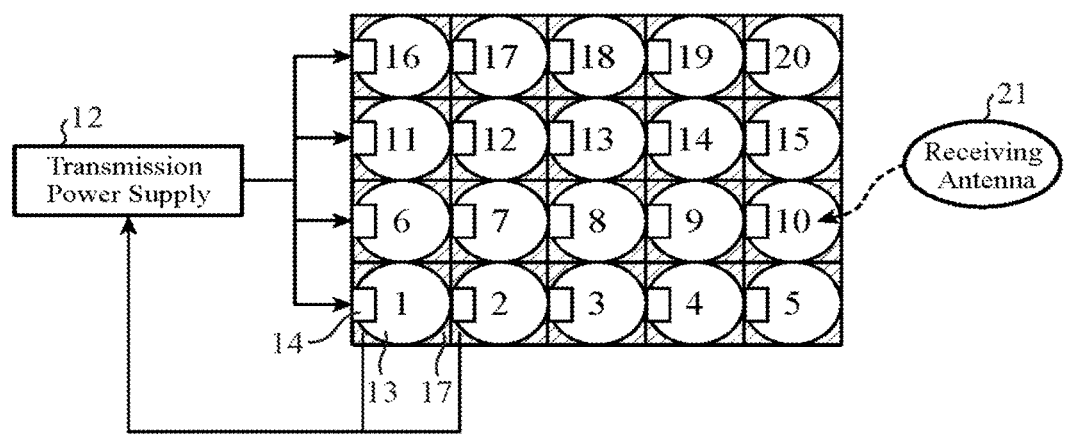
FIG. 14 is a diagram showing the configuration of a resonance type power transmission system according to Embodiment 6 of the present invention.

FIG. 14 is a diagram showing the configuration of a resonance type power transmission system according to Embodiment 6 of the present invention. In the resonance type power transmission system according to the Embodiment 6 shown in FIG. 14, plural position estimation auxiliary units (transmission side position estimation auxiliary units) 17 are added to the components of the transmitting device 1 of the resonance type power transmission system according to Embodiment 1 shown in FIG. 1. The other components are the same as those according to Embodiment 1, and the explanation below will be made for only a difference while the other components are designated by the same reference numerals. In FIG. 14, the primary power supply 11 and the rectifier circuit 22 are not illustrated.

The position estimation auxiliary units 17 are provided for the plural transmitting antennas 13, respectively, and each of the position estimation auxiliary units detects the existence of the receiving antenna 21 in order to assist position estimation performed by the receiving antenna 21. As these position estimation auxiliary units 17, for example, sensors, such as pressure sensors, photosensors, or magnetic sensors, can be used.

When estimating the position of the receiving antenna 21, the switch control unit 125 uses the detection results acquired by the position estimation auxiliary units 17. As a result, the accuracy of estimation of the position of the receiving antenna 21 is improved.

The case in which the function according to Embodiment 6 is provided for the configuration according to Embodiment 1 (configuration in which a single transmission power supply 12 is provided for the plural transmitting antennas 13) is shown above. In contrast with this, the function according to Embodiment 6 can be provided for the configuration according to Embodiment 2 (configuration in which a transmission power supply 12 is provided for each of the plural transmitting antennas 13). Accordingly, the same advantage can be provided.

Embodiment 7

The case in which the position estimation auxiliary units 17 are provided in the transmitting device 1 is shown in Embodiment 6. In contrast with this, a case in which a position estimation auxiliary unit 23 is provided in the receiving device 2 will be shown in Embodiment 7.

Figure 15:
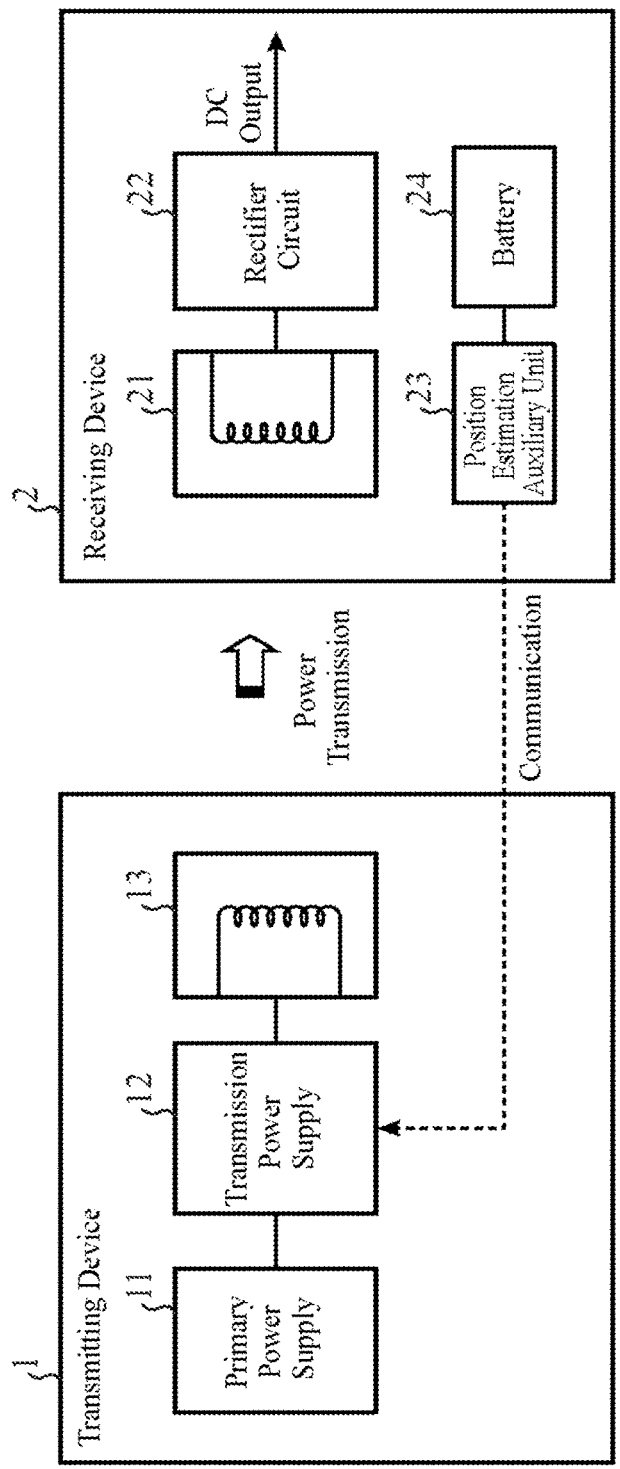
FIG. 15 is a diagram showing the configuration of a resonance type power transmission system according to Embodiment 7 of the present invention.

FIG. 15 is a diagram showing the configuration of a resonance type power transmission system according to Embodiment 7 of the present invention. In the resonance type power transmission system according to the Embodiment 7 shown in FIG. 15, the position estimation auxiliary unit (reception side position estimation auxiliary unit) 23 and a battery 24 are added to the components of the receiving device 2 of the resonance type power transmission system according to Embodiment 1 shown in FIG. 1. The other components are the same as those according to Embodiment 1, and the explanation below will be made for only a difference while the other components are designated by the same reference numerals. In FIG. 15, only one transmitting antenna 13 is illustrated, and the switches 14 are not illustrated.

The position estimation auxiliary unit 23 is provided in the receiving device 2, and, in order to assist the position estimation performed by the receiving antenna 21, when the receiving antenna 21 gets close to a transmitting antenna 13, notifies the existence of the receiving antenna 21 to the transmitting device 1. As this position estimation auxiliary unit 23, for example, a sensor, such as a pressure sensor for, when the receiving antenna 21 comes in contact with a transmitting antenna 13, detecting the contact therebetween, or a gyro sensor for detecting the current position of the receiving antenna 21, and a communication device for notifying the detection result obtained by this sensor to the switch control unit 125 of the transmission power supply 12 can be used. This position estimation auxiliary unit 23 is driven by the battery 24 provided in the receiving device 2.

When estimating the position of the receiving antenna 21, the switch control unit 125 uses the result which is notified thereto by the position estimation auxiliary unit 23. As a result, the accuracy of estimation of the position of the receiving antenna 21 is improved.

The configuration according to Embodiment 7 can be applied to both the configuration according to Embodiment 1 (configuration in which a single transmission power supply 12 is provided for the plural transmitting antennas 13), and the configuration according to Embodiment 2 (configuration in which the transmission power supply 12 is provided for each of the plural transmitting antennas 13).

Embodiment 8

Figure 16:
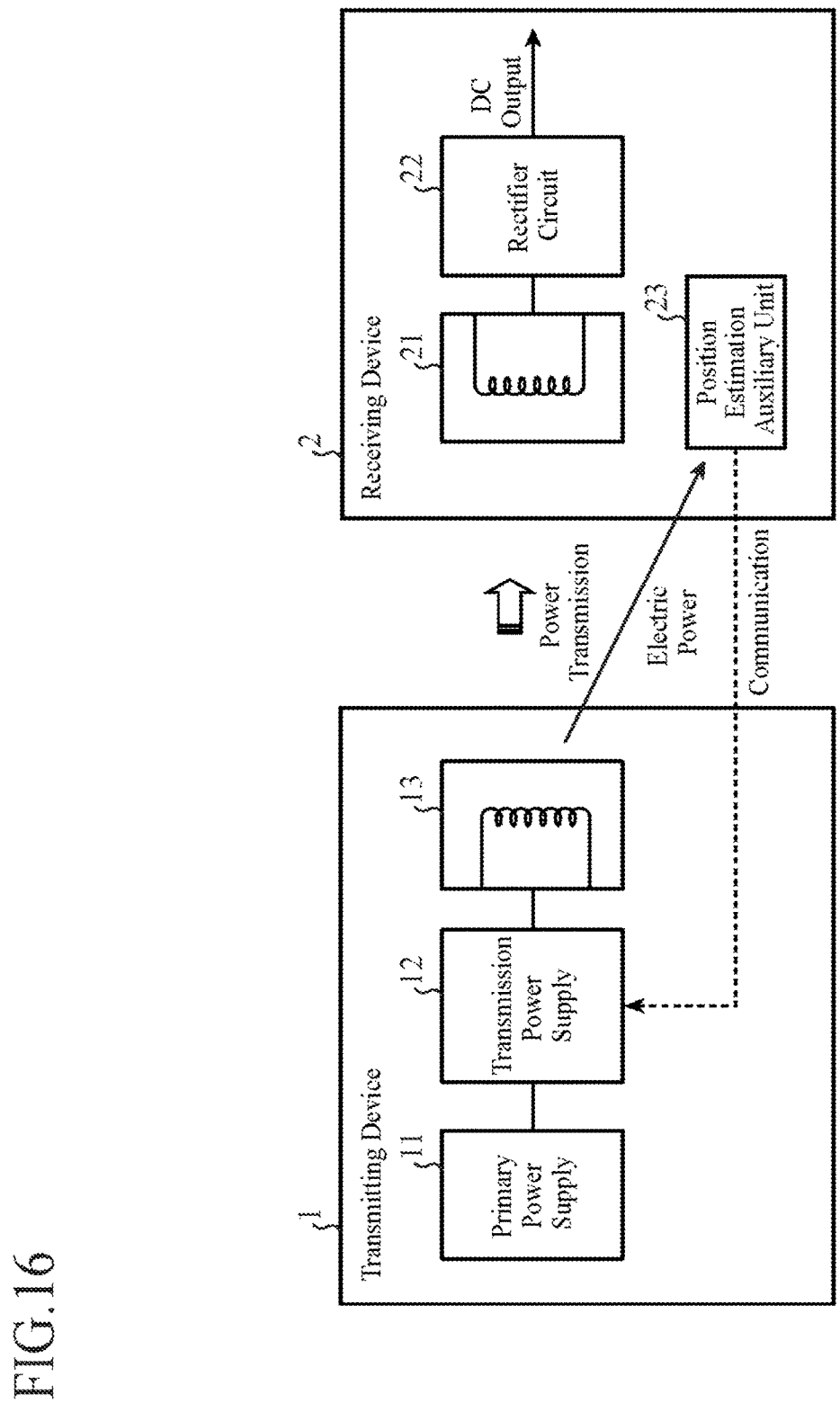
FIG. 16 is a diagram showing the configuration of a resonance type power transmission system according to Embodiment 8 of the present invention.

The example in which the position estimation auxiliary unit 23 is driven by the battery 24 provided in the receiving device 2 is shown in Embodiment 7. In contrast with this, as shown in FIG. 16, the position estimation auxiliary unit 23 can be driven by electric power which is supplied thereto when the receiving antenna 21 gets close to a transmitting antenna 13.

The configuration according to Embodiment 8 can be applied to both the configuration according to Embodiment 1 (configuration in which the single transmission power supply 12 is provided for the plural transmitting antennas 13), and the configuration according to Embodiment 2 (configuration in which the transmission power supply 12 is provided for each of the plural transmitting antennas 13).

In Embodiments 1 to 8, the example in which the functions of the power supply position control system are applied to the resonance type power transmission system, and power transmission is performed is shown. However, the embodiments are not limited to this example. The power supply position control system can be applied to a system that performs an operation other than power transmission. For example, the power supply position control system can be applied to a system that estimates the position of the receiving antenna 21 which has got close to a transmitting antenna 13, performs switching in such a way as to cause the transmitting antenna 13 to operate, and that performs visible light communications or voice communications between the transmitting antenna 13 and the receiving antenna 21.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The resonance type power transmission system according to the present invention is suitable for use as a resonance type power transmission system or the like that can achieve downsizing, reduction in weight, and reduction in cost with regard to the whole system and can reduce its power consumption, and that includes a transmitting device having plural transmitting antennas, and a receiving device having a receiving antenna, as compared with a system having the conventional configuration.

REFERENCE SIGNS LIST 1 transmitting device, 2 receiving device, 11 primary power supply, 12 transmission power supply, 13 transmitting antenna, 14 switch, 15 position information acquiring unit, 16 recording unit, 17 position estimation auxiliary unit (transmission side position estimation auxiliary unit), 21 receiving antenna, 22 rectifier circuit, 23 position estimation auxiliary unit (reception side position estimation auxiliary unit), 24 battery, 121 inverter circuit, 122 input detecting unit, 123 power supply parameter detecting unit, 124 output detecting unit, 125 switch control unit, and 126 matching circuit.

The invention claimed is:

1. A resonance type power transmission system comprising:
    a transmitting device including plural transmitting antennas, and a receiving device including a receiving antenna;
    wherein the transmitting device comprises:
    one transmission power supply to output electric power, whose frequency matches a resonance frequency of each of the transmitting antennas, on a basis of input power;
    plural switches respectively provided for the transmitting antennas, the switches being switchable to connect or disconnect supply lines for supplying the electric power outputted by the transmission power supply to the transmitting antennas;
    a parameter detector comprised of a function of preventing breakage of the transmission power supply, the function being included by the transmission power supply, to detect parameters regarding the transmission power supply, the parameters being changed as the receiving antenna gets close to the transmitting antennas;
    a switch controller to estimate a position of the receiving antenna from a result of the detection performed by the parameter detector, and to perform switching control on the switches in accordance with the position of the receiving antenna; and
    a matching circuit that matches impedance of the transmission power supply to that of each of the transmitting antennas, and wherein when the estimated position of the receiving antenna extends over those of two or more of the transmitting antennas, the switch controller switches the switches to connect the supply lines of the two or more of the transmitting antennas and causes the matching circuit to control a phase difference of the electric power outputted to the two or more transmitting antennas.

2. The resonance type power transmission system according to claim 1, the parameter detector detects plural parameters.

3. The resonance type power transmission system according to claim 1, wherein the parameter detector includes an input detector to detect a parameter regarding the input power.

4. The resonance type power transmission system according to claim 1, wherein the parameter detector includes a power supply parameter detector to detect parameters regarding an inside of the transmission power supply.

5. The resonance type power transmission system according to claim 1, wherein the parameter detector includes an output detector to detect a parameter regarding the electric power outputted from the transmission power supply.

6. The resonance type power transmission system according to claim 1, wherein when estimating the position of the receiving antenna, the switch controller switches the switches to connect the supply lines of all of the transmitting antennas.

7. The resonance type power transmission system according to claim 1, wherein when estimating the position of the receiving antenna, the switch controller switches the switches to connect the supply lines of the transmitting antennas in sequence.

8. The resonance type power transmission system according to claim 1, wherein the transmitting device includes a position information acquirer to, in a learning operation, acquire pieces of information showing positions at each of which the receiving antenna is placed, and a recorder, in the learning operation, to record detection results acquired by the parameter detector, and the pieces of information showing the positions of the receiving antenna acquired by the position information acquirer while associating the detection results with the pieces of information, and wherein when estimating the position of the receiving antenna, the switch controller uses the pieces of information recorded in the recorder.

9. The resonance type power transmission system according to claim 1, wherein when the estimated position of the receiving antenna extends over those of two or more of the transmitting antennas, the switch controller switches the switches to connect the supply line of one of the two or more transmitting antennas in which changes in the parameters detected by the parameter detector is great.

10. The resonance type power transmission system according to claim 1, wherein the transmitting device comprises a transmission side position estimation auxiliary unit provided for each of the transmitting antennas, to detect existence of the receiving antenna when the receiving antenna gets close to the transmitting antenna, and, when estimating the position of the receiving antenna, the switch controller uses a result of the detection performed by the transmission side position estimation auxiliary unit.

11. The resonance type power transmission system according to claim 1, wherein the receiving device comprises a reception side position estimation auxiliary unit to notify existence of the receiving antenna to the transmitting device when the receiving antenna gets close to the transmitting antennas, and, when estimating the position of the receiving antenna, the switch controller uses a result of the detection performed by the reception side position estimation auxiliary unit.

12. The resonance type power transmission system according to claim 11, wherein when the receiving antenna gets close to the transmitting antennas, the reception side position estimation auxiliary unit operates with electric power supplied from the transmitting antennas.

13. A transmitting device comprising:
plural transmitting antennas;
one transmission power supply to output electric power, whose frequency matches a resonance frequency of each of the transmitting antennas, on a basis of input power;
plural switches respectively provided for the transmitting antennas, the switches being switchable to connect or disconnect supply lines for supplying the electric power outputted by the transmission power supply to the transmitting antennas;
a parameter detector comprised of a function of preventing breakage of the transmission power supply, the function being included by the transmission power supply, to detect parameters regarding the transmission power supply, the parameters being changed as a receiving antenna of a receiving device gets close to the transmitting antennas;
a switch controller to estimate a position of the receiving antenna from a result of the detection performed by the parameter detector, and to perform switching control on the switches in accordance with the position of the receiving antenna; and
a matching circuit that matches impedance of the transmission power supply to that of each of the transmitting antennas, and wherein when the estimated position of the receiving antenna extends over those of two or more of the transmitting antennas, the switch controller switches the switches to connect the supply lines of the two or more of the transmitting antennas and causes the matching circuit to control a phase difference of the electric power outputted to the two or more transmitting antennas.

14. A power supply position control system comprising:
a transmitting device including plural transmitting antennas, and a receiving device including a receiving antenna;
wherein the transmitting device comprises:
one transmission power supply to output electric power, whose frequency matches a resonance frequency of each of the transmitting antennas, on a basis of input power;
plural switches respectively provided for the transmitting antennas, the switches being switchable to connect or disconnect supply lines for supplying the electric power outputted by the transmission power supply to the transmitting antennas;
a parameter detector comprised of a function of preventing breakage of the transmission power supply, the function being included by the transmission power supply, to detect parameters regarding the transmission power supply, the parameters being changed as the receiving antenna gets close to the transmitting antennas;
a switch controller to use a protective function of the transmission power supply, estimate a position of the receiving antenna from a result of the detection performed by the parameter detector, and perform switching control on the switches in accordance with the position of the receiving antenna; and
a matching circuit that matches impedance of the transmission power supply to that of each of the transmitting antennas, and wherein when the estimated position of the receiving antenna extends over those of two or more of the transmitting antennas, the switch controller switches the switches to connect the supply lines of the two or more of the transmitting antennas and causes the matching circuit to control a phase difference of the electric power outputted to the two or more transmitting antennas.

15. A resonance type power transmission system comprising:
a transmitting device including plural transmitting antennas, and a receiving device including a receiving antenna;

wherein the transmitting device comprises:
a transmission power supply to output electric power, whose frequency matches a resonance frequency of each of the transmitting antennas, on a basis of input power;
plural switches respectively provided for the transmitting antennas, the switches being switchable to connect or disconnect supply lines for supplying the electric power outputted by the transmission power supply to the transmitting antennas;
a parameter detector to detect parameters regarding the transmission power supply, the parameters being changed as the receiving antenna gets close to the transmitting antennas; and
a switch controller to estimate a position of the receiving antenna from a result of the detection performed by the parameter detector, and to perform switching control on the switches in accordance with the position of the receiving antenna; and
a matching circuit that matches impedance of the transmission power supply to that of each of the transmitting antennas, and wherein when the estimated position of the receiving antenna extends over those of two or more of the transmitting antennas, the switch controller switches the switches to connect the supply lines of the two or more of the transmitting antennas and causes the matching circuit to control a phase difference of the electric power outputted to the two or more transmitting antennas.

16. A transmitting device comprising:
plural transmitting antennas;
a transmission power supply to output electric power, whose frequency matches a resonance frequency of each of the transmitting antennas, on a basis of input power;
plural switches respectively provided for the transmitting antennas, the switches being switchable to connect or disconnect supply lines for supplying the electric power outputted by the transmission power supply to the transmitting antennas;
a parameter detector to detect parameters regarding the transmission power supply, the parameters being changed as a receiving antenna of a receiving device gets close to the transmitting antennas;
a switch controller to estimate a position of the receiving antenna from a result of the detection performed by the parameter detector, and to perform switching control on the switches in accordance with the position of the receiving antenna; and
a matching circuit that matches impedance of the transmission power supply to that of each of the transmitting antennas, and wherein when the estimated position of the receiving antenna extends over those of two or more of the transmitting antennas, the switch controller switches the switches to connect the supply lines of the two or more of the transmitting antennas and causes the matching circuit to control a phase difference of the electric power outputted to the two or more transmitting antennas.

17. A power supply position control system comprising:
a transmitting device including plural transmitting antennas, and a receiving device including a receiving antenna;
wherein the transmitting device comprises:
a transmission power supply to output electric power, whose frequency matches a resonance frequency of each of the transmitting antennas, on a basis of input power;
plural switches respectively provided for the transmitting antennas, the switches being switchable to connect or disconnect supply lines for supplying the electric power outputted by the transmission power supply to the transmitting antennas;
a parameter detector to detect parameters regarding the transmission power supply, the parameters being changed as the receiving antenna gets close to the transmitting antennas;
a switch controller to use a protective function of the transmission power supply, estimate a position of the receiving antenna from a result of the detection performed by the parameter detector, and perform switching control on the switches in accordance with the position of the receiving antenna; and
a matching circuit that matches impedance of the transmission power supply to that of each of the transmitting antennas, and wherein when the estimated position of the receiving antenna extends over those of two or more of the transmitting antennas, the switch controller switches the switches to connect the supply lines of the two or more of the transmitting antennas and causes the matching circuit to control a phase difference of the electric power outputted to the two or more transmitting antennas.

* * * * *